US011284404B2

(12) United States Patent
Noble et al.

(10) Patent No.: US 11,284,404 B2
(45) Date of Patent: Mar. 22, 2022

(54) APPARATUS AND METHOD FOR COMMUNICATIONS IN CONGESTED RADIO FREQUENCY ENVIRONMENTS VIA DYNAMIC USAGE EXCHANGE

(71) Applicant: Raytheon Company, Waltham, MA (US)

(72) Inventors: William B. Noble, Santa Monica, CA (US); John S. Ward, Roanoke, IN (US); Kevin Yang, Monrovia, CA (US); Kelly N. Cerier, Torrance, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/269,874

(22) Filed: Feb. 7, 2019

(65) Prior Publication Data

US 2020/0260458 A1 Aug. 13, 2020

(51) Int. Cl.
*H04W 72/08* (2009.01)
(52) U.S. Cl.
CPC ................................. *H04W 72/082* (2013.01)
(58) Field of Classification Search
CPC .................................................. H04W 72/082
USPC ......................................................... 370/329
See application file for complete search history.

(56) References Cited

U.S. PATENT DOCUMENTS

| 4,513,249 A | 4/1985 | Baghdady |
| 5,912,917 A | 6/1999 | Engelbrecht et al. |
| 6,195,554 B1 | 2/2001 | H'mimy et al. |
| 6,421,328 B1 | 7/2002 | Larribeau et al. |
| 6,512,928 B1 | 1/2003 | Janky et al. |
| 7,190,749 B2 | 3/2007 | Levin et al. |
| 7,580,389 B2 | 8/2009 | Kirk et al. |
| 8,279,767 B2 | 10/2012 | Kang et al. |
| 8,521,206 B2 | 8/2013 | Borran et al. |
| 8,565,183 B2 * | 10/2013 | Banerjea ................ H04W 16/14 370/329 |
| 8,923,225 B2 | 12/2014 | Sydor et al. |

(Continued)

FOREIGN PATENT DOCUMENTS

EP          2077685 A1    7/2009

OTHER PUBLICATIONS

Dabcevic, Kresimir, et al., "Security in Cognitive Radio Networks", Evolution of Cognitive Networks and Self-Adaptive Communication Systems, (2013), 301-335.

(Continued)

*Primary Examiner* — Kwang B Yao
*Assistant Examiner* — Xuan Lu
(74) *Attorney, Agent, or Firm* — Schwegman Lundberg & Woessner, P.A.

(57) ABSTRACT

A device and method of avoiding future self-interference are described. During a current predetermined time period, a priori knowledge of an RF environment is used to determine a change in the environment in a next predetermined time period. Transmission on an interfering channel in response to the change leads to generation of an indication to another device to switch communications in the next predetermined time period to a new channel that is unaffected by transmission on the interfering channel. The new channel is set by the indication or is negotiated by the other device from a list of channels to use in the indication.

21 Claims, 4 Drawing Sheets

(56) References Cited

U.S. PATENT DOCUMENTS

| | | | |
|---|---|---|---|
| 8,989,235 B2 | 3/2015 | Abdelmonem et al. | |
| 8,989,954 B1* | 3/2015 | Addepalli | H04W 4/00 |
| | | | 701/32.3 |
| 9,420,476 B2 | 8/2016 | Koutsimanis et al. | |
| 10,084,493 B1 | 9/2018 | Cordone et al. | |
| 2007/0026806 A1* | 2/2007 | Kuroda | H04W 36/06 |
| | | | 455/63.3 |
| 2007/0104139 A1* | 5/2007 | Marinier | H04W 48/10 |
| | | | 370/329 |
| 2009/0227261 A1* | 9/2009 | Tiirola | H04W 16/10 |
| | | | 455/450 |
| 2011/0258678 A1 | 10/2011 | Cowling et al. | |
| 2014/0313908 A1* | 10/2014 | da Silva | H04W 4/70 |
| | | | 370/252 |
| 2015/0092704 A1* | 4/2015 | Chen | H04W 72/1231 |
| | | | 370/329 |
| 2015/0139422 A1* | 5/2015 | Jover | H04W 12/04 |
| | | | 380/270 |
| 2015/0146696 A1* | 5/2015 | Golitschek Edler Von Elbwart | H04L 1/0029 |
| | | | 370/335 |
| 2015/0181546 A1* | 6/2015 | Freda | H04W 56/0015 |
| | | | 370/336 |
| 2016/0088631 A1 | 3/2016 | Hedayat et al. | |
| 2016/0183268 A1 | 6/2016 | Albano et al. | |
| 2016/0301434 A1* | 10/2016 | Botchway | H04W 52/24 |
| 2016/0309482 A1 | 10/2016 | Verma et al. | |
| 2017/0353929 A1 | 12/2017 | Tacconi et al. | |
| 2018/0063851 A1* | 3/2018 | Abraham | H04W 72/06 |
| 2018/0115370 A1* | 4/2018 | Kim | H04L 27/26 |
| 2019/0037418 A1* | 1/2019 | Gunasekara | H04W 52/245 |
| 2019/0268852 A1* | 8/2019 | Ryu | H04W 52/38 |
| 2020/0068578 A1* | 2/2020 | Lee | H04B 7/15507 |

OTHER PUBLICATIONS

Gopaluni, Pradeep, et al., "Interference Estimation and Automated Generation of Spatial Reuse Map for Wireless Mesh Networks", [Online] Retrieved from the Internet: URL: https://www.cse.iitb.ac.in/~br/iitk-webpage/students/2008/gpradeep-pres.pdf, 51 pgs.

Höyhtyä, Marko, et al., "Spectrum Occupancy Measurements in the 2.3-2.4 GHz band: Guidelines for Licensed Shared Access in Finland", EAI Endorsed Transactions on Cognitive Communications vol. 01 | Issue 2, (May 28, 2015), 11 pgs.

Nebbia, Karl, et al., "Spectrum Resource Assessment of the Frequency Bands From 17.7-40.5 GHZ", NTIA Report 84-155, [Online] Retrieved from the Internet: URL: www.its.bldrdoc.gov/publications/download/84-155_ocr.pdf, (Aug. 1984), 106 pgs.

Zou, Chao, et al., "Dynamic spectrum access-based cryptosystem for cognitive radio networks", Security Comm. Networks 2016, (Aug. 22, 2016), 4151-4165.

"International Application Serial No. PCT/US2020/016729, International Search Report dated May 6, 2020", 4 pgs.

"International Application Serial No. PCT/US2020/016729, Written Opinion dated May 6, 2020", 7 pgs.

\* cited by examiner

APPARATUS AND METHOD FOR COMMUNICATIONS IN CONGESTED RADIO FREQUENCY ENVIRONMENTS VIA DYNAMIC USAGE EXCHANGE

TECHNICAL FIELD

Embodiments discussed herein regard devices, systems, and methods for communicating in a radio frequency (RF) environment.

BACKGROUND

With the explosion of disparate devices, as well as the amount of data and bandwidth being used by various applications, such as video streaming, operating on the devices, the use of communication networks and resources over different RF spectrum continues to increase. The increase in network use results in increased interference, reducing throughput and decreasing quality of service. The interference at a particular device may be caused not only by other nearby devices in the network, but in some circumstances, by the device itself (referred to herein as self-interference).

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

Embodiments generally relate to enabling communications between devices based on a priori knowledge of interference caused by both external communication sources and self-interference by a device. The self-interference may be generated in response to signals of at least some of the external communication sources impinging on the device.

Figure 1:
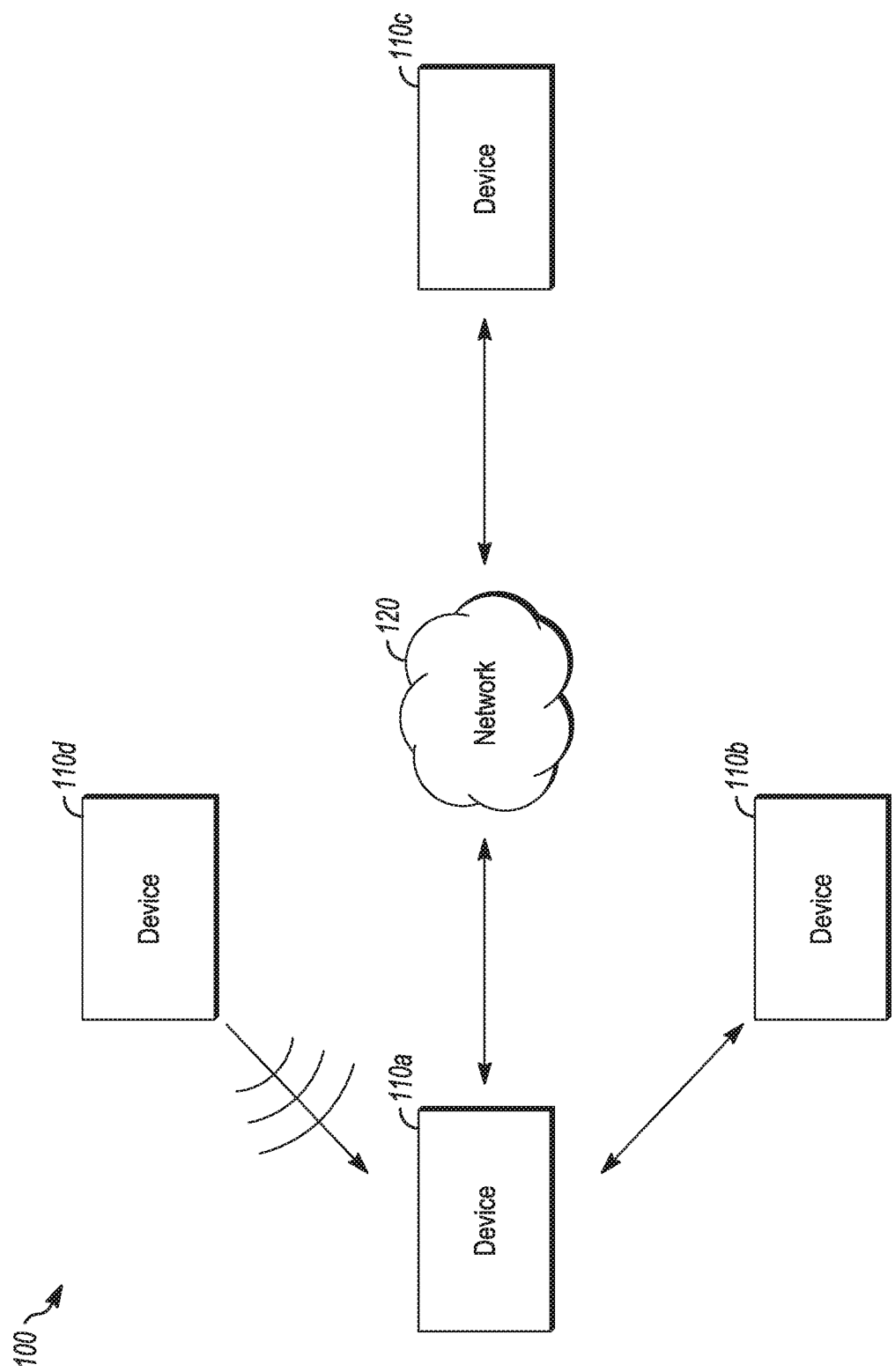
FIG. 1 is a functional block diagram illustrating a communication system according to some embodiments.

FIG. 1 is a functional block diagram illustrating a communication system according to some embodiments. The system 100 may include multiple communication devices 110a, 110b, 110c, 110d. The communication devices 110a, 110b, 110c may communicate with each other directly (e.g., via P2P or other short range communication protocol) or via one or more short range or long range wireless networks 120. The communication devices 110a, 110b, 110c may, for example, communicate wirelessly locally, for example, via one or more micro, pico or nano base stations (BSs) or access points (APs) or directly using any of a number of different techniques, such as WiFi, Bluetooth or Zigbee, among others. Alternatively, the communication devices 110 may also communicate through the network 120 such as via Third Generation Partnership Project Long Term Evolution (3GPP LTE) networks and LTE advanced (LTE-A) networks, $4^{th}$ generation (4G) networks or next ($5^{th}$) generation (NG) networks. Although wireless communications are mainly described, in some embodiments, one or more of the communication devices 110a, 110b, 110c may also or instead communicate via a wired link. Examples of communication devices 110a, 110b, 110c include, but are not limited to, mobile devices such as portable handsets, smartphones, tablet computers, laptop computers, wearable devices, and sensors.

The network 120 may contain network devices such as an access point for WiFi networks, a base station (which may be e.g., an enhanced NodeB (eNB) or NG NodeB (gNB)), gateway (e.g., a serving gateway and/or packet data network gateway), a Home Subscriber Server (HSS), a Mobility Management Entity (MME) for LTE networks or an Access and Mobility Function (AMF), etc., for NG networks. The network may also contain various servers that provide content or other information related to user accounts. During a communication session through the network 120, a transmitting communication device 110a may typically transmit a signal using one of a number of wireless protocols, examples of which are provided above.

The system 100 may also contain one or more other communication devices 110d whose transmissions cause interference 140, as shown, with at least one of the communication devices 110a. In some circumstances, the interference 140 caused by the communication device 110d may be inadvertent; that is, the interference 140 may be caused by the communication device 110d during communication with a communication device other than the communication device 110a being interfered with (and have no deliberate communications with the communication device 110a). Note that this interference can also occur with non-communication devices, such as those actuated to provide mechanical or electrical effects primarily unassociated with communications (e.g., a microwave oven in a kitchen or industrial machine). In other circumstances, the interference 140 caused by the communication device 110d may be deliberate; for example, the interference 140 may be caused by the communication device 110d to jam communications of the communication device 110a. In this latter case, the communication device 110a may be able to predict the interference 140 and, in response, take countermeasures to neutralize the jamming communication device 110d or otherwise avoid the interference 140 when communicating with other communication devices 110b, 110c.

In some cases, the amount of power in the transmissions among the communication devices 110a, 110b, 110c may be substantially different, which may enable the interference 140 to cause problems in communications among the communication devices 110a, 110b, 110c. For example, while typical communications devices such as smartphones or sensors may only be able to transmit at low power due to hardware limitations (e.g., batteries or power amplifiers) and/or by maximum power limits set regulations or by the network or protocols used, other communication devices (such as those used by the military) may be able to transmit with very high power. Furthermore, the impact of a given source of interference depends strongly on the geometry of the network and typically this impact will be different for each device in the network. For example, while the communication device 110a may be able to transmit to the other communication devices 110b, 110c with sufficient power for the other communication devices 110b, 110c to be able to detect and decode the transmissions even with the interference 140 being present, the communication device 110a may be unable to detect or decode transmissions from the other communication devices 110b, 110c due to the interference 1400. This is discussed in more detail below, after embodiments of the communication device are provided.

Figure 2:
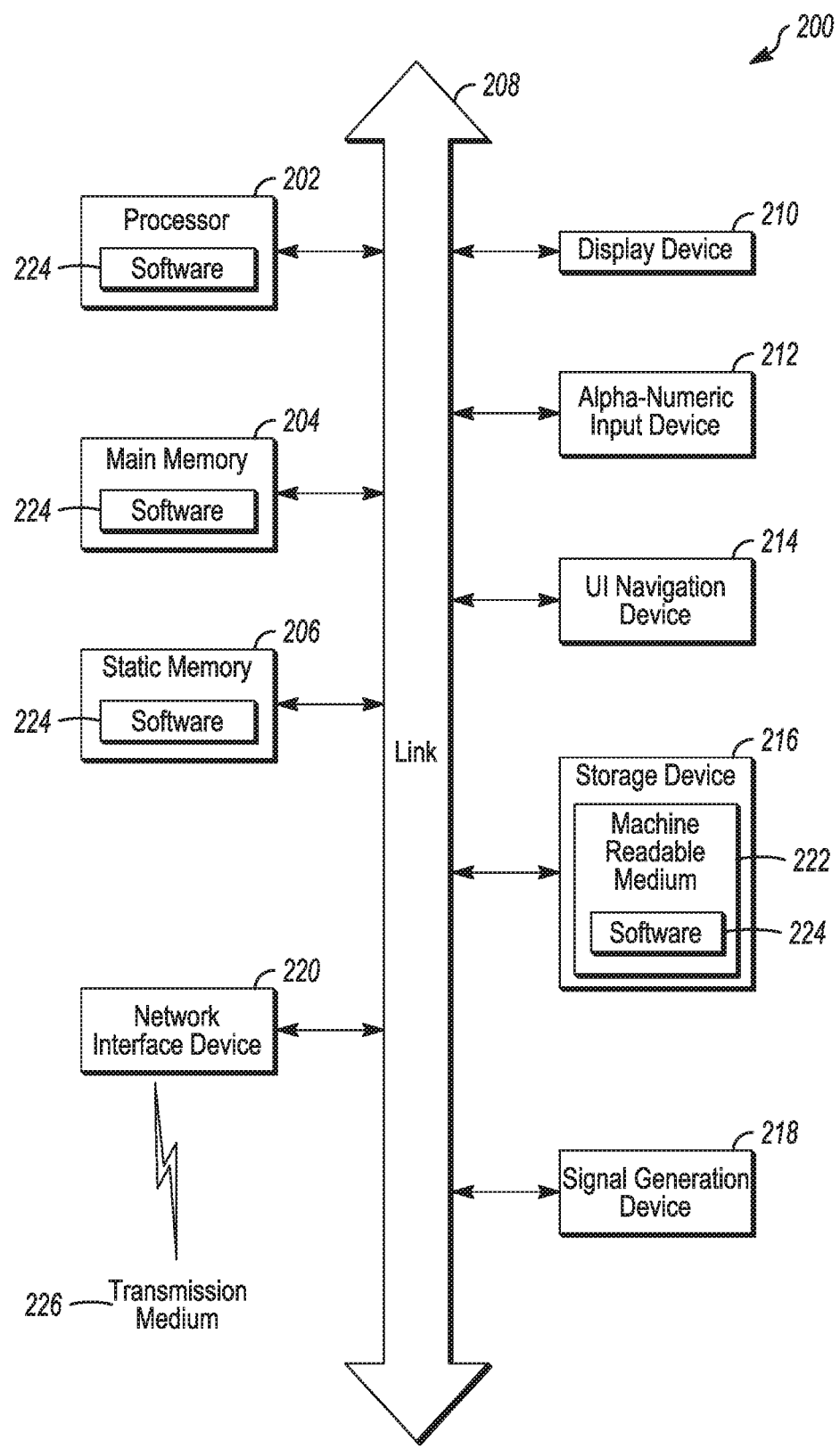
FIG. 2 illustrates a block diagram of a communication device in accordance with some embodiments.

FIG. 2 illustrates a block diagram of a communication device in accordance with some embodiments. The communication device 200 may be a specialized computer, a personal or laptop computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine. In some embodiments, the communication device 200 may be embedded within other, non-communication based devices such as vehicles and appliances.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed, such as programming an FPGA or using software) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Figure 3:
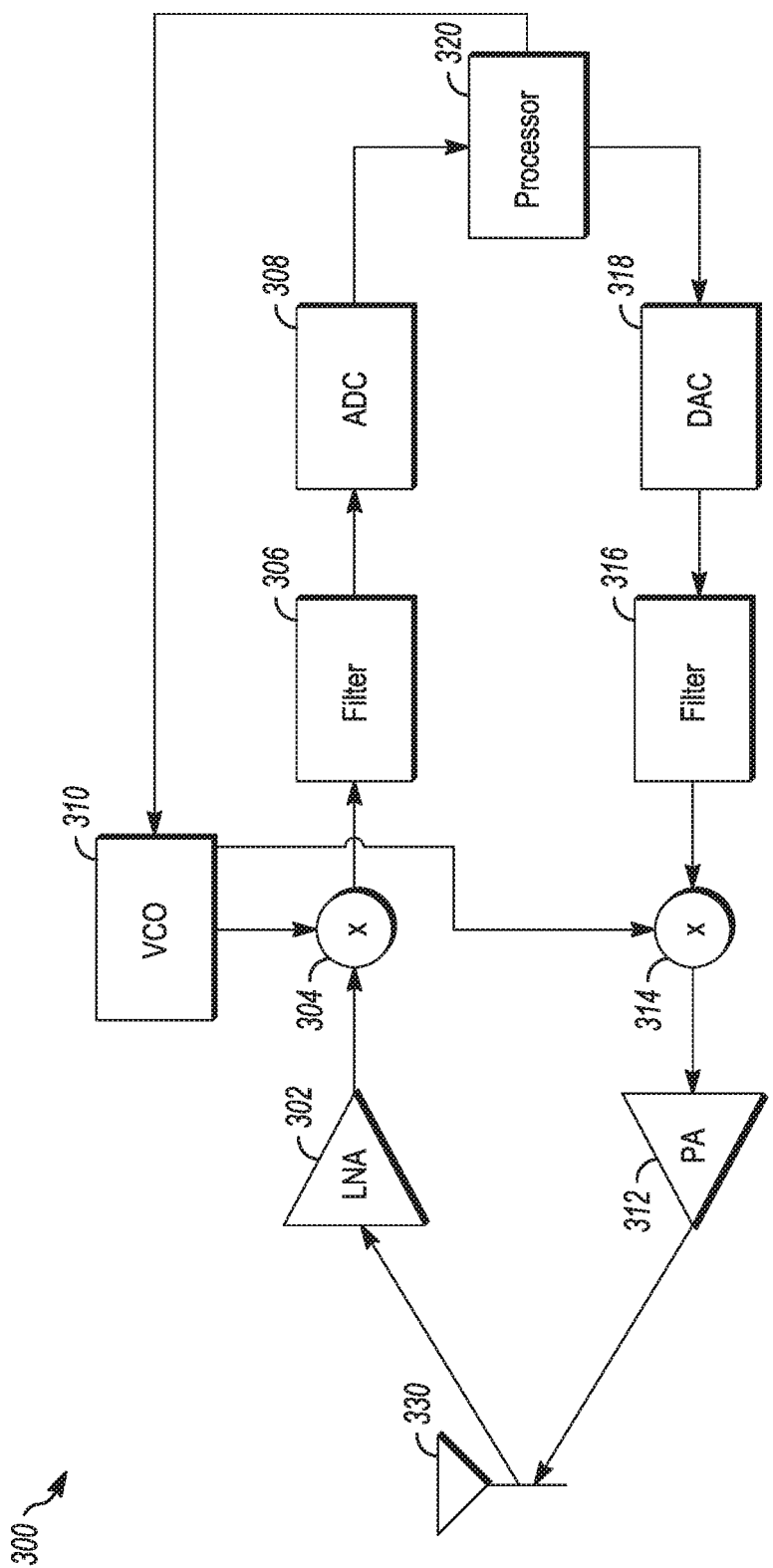
FIG. 3 illustrates another block diagram of the communication device in accordance with some embodiments.

FIG. 3 illustrates another block diagram of the communication device in accordance with some embodiments. FIG. 3 illustrates only one example a communication device—other architectures may be used. The communication device 300 may be the same as that shown in FIGS. 1 and 2. Other components may be provided in the communication device 300 but are not shown for convenience. RF signals from other sources may be received at one or more antennas 330. The antennas 330 may be directional antennas, whose signals are directed towards a particular device, or omnidirectional antennas. The received RF signals may be supplied to a receive path, where the signals are amplified by a low noise amplifier (LNA) 302 before being supplied to a mixer 304. Additional amplifiers and/or buffers may be disposed between the LNA 302 and the mixer 304. The mixer 304 may be tuned by a voltage control oscillator (VCO) 310 to mix the RF frequencies down to baseband (or to an intermediate frequency for further processing and then to baseband). The baseband signals may then be lowpass filtered by a filter 306. Other filters, such as bandpass filters may be inserted before or after the LNA 306. The filtered baseband signal may then be converted to a digital signal at an analog-to-digital converter (ADC) 308 before supplying the digital signal to the processor 320 to perform the actions indicated herein.

The processor 320 may detect and decode radio frequency (RF) signals received from another communication device as well as the interference. The processor 320 may, in response, generate RF communications for transmission through a transmit path to the other communication device and signals to combat the interference. The digital RF signals may be supplied to a digital-to-analog converter (DAC) 318, filtered by filter 316, optionally upconverted by one or more mixers 314 and then amplified by a power amplifier 312 before being transmitted by the antennas 330. As above, other components similar to those mentioned above may be present, but are not shown for convenience. The same or different antennas may be used for transmission and reception. Similarly, the same or different transceivers may be used for RF communications with other devices and to respond to the interference.

As above, with a sufficiently large power amplifier (PA), the communication device may be able to transmit to another communication device with sufficient power for the other communication device to be able to detect and decode the transmissions even when interference is present. However, the other communication device may not be able to transmit with the same amount of power, and thus the communication device may be unable to receive communications from the other communication device. Typically, the interference (whether intentional or not) may be intermittent on the RF channel used for communication with the other communication device. In most cases, simply pausing the communications until the interference ends is at best impractical, while partial or total cancellation of the interference by the communication device may employ a significant amount of resources.

Various techniques have been used to enable communications when interference is present. Among these the communication devices may use Dynamic Spectrum Management (DSM). DSM may employ multiple solutions, including link adaption techniques, bandwidth management techniques, and antenna techniques. Link adaption may employ adaptive coding and modulation, in which the modulation and coding scheme (MCS) is altered to maintain a robust link between the communication devices when channel conditions degrade such as when interference is present. Forward error correction can be increased as channel conditions degrade due to interference. Antenna techniques may include, for example, multi-user multiple-input-multiple-output (MIMO), in which multiple antennas are used for communicating the same signal and Activer Electronically-Scanned Arrays (AESAs).

Further techniques to enable communications between the communication devices may be used in addition or instead of the above. These techniques may include direct-sequence spread spectrum (DSSS), in which the signal is spread over a wideband channel and used to modulate a pseudo noise code, allowing for greater resistance to unintentional and intentional interference. The frequency hopping spread spectrum (FHSS), e.g., Single Channel Ground and Airborne Radio System (SINCGARS) and Link 16, hops between numerous channels using a known pseudorandom sequence. A sub-type of FHSS, Adaptive Frequency Hopping Spread Spectrum (AFH) may be used for Bluetooth. Multiple Access with Collision Avoidance for Wireless (MACAW) may be used in ad hoc networks such as IEEE 802.11, and may employ request-to-send (RTS), clear-to-send (CTS) and acknowledgment frames to avoid interference. Adaptive notching, in which the transfer function of an adaptive notch filter is controllable, may be used in both transmitters and receivers, e.g., Mobile User Objective System (MUOS).

In some cases, however, the above techniques alone may be unable to provide an adequate communication session during the presence of interference. Forward error correction (FEC) and interleaving, for example, may be to restore lost data in poor channel conditions but may be unable to operate through severe interference and may be unable to mitigate interference when link margins were already low. Further, only past data is used to formulate a response to interference—which is reactive rather than proactive to the current noise spectrum. For example, collision avoidance is typically used by listening to the channel and detecting channel use.

Figure 4:
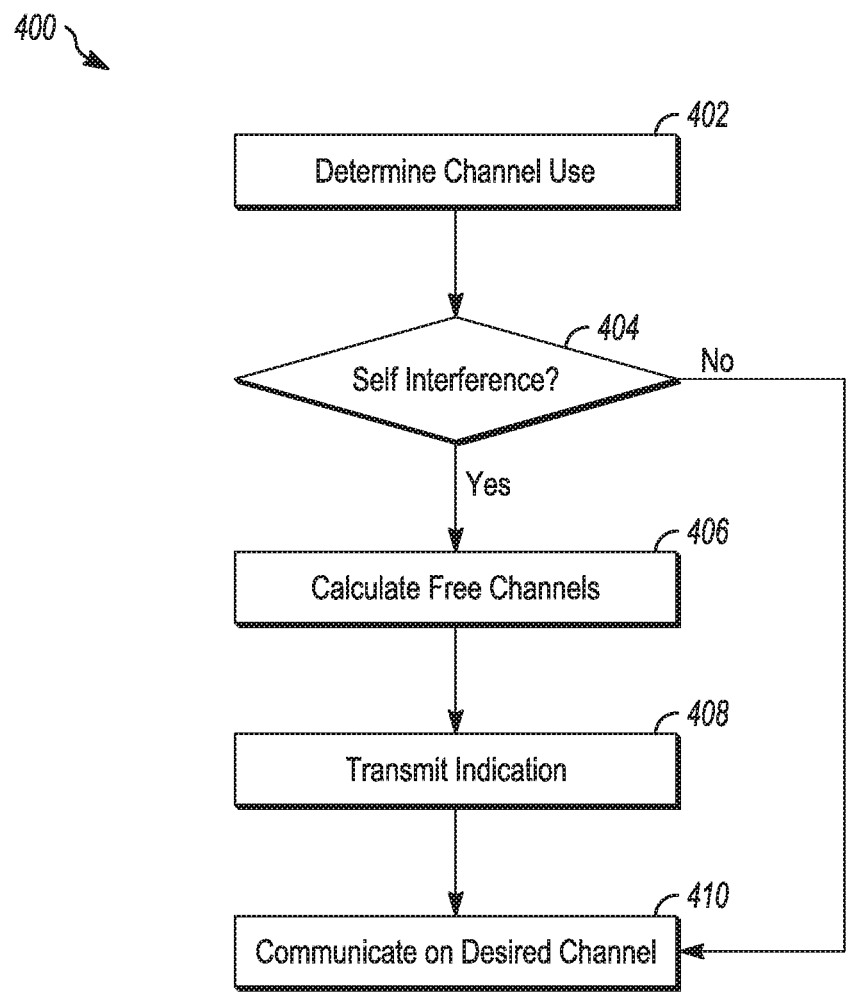
FIG. 4 illustrates a communication flowchart in accordance with some embodiments.

Instead of or in addition to the above techniques, communications may be enabled in a predictive manner. This may be the case independent of whether the interference is intentional, and, if intentional (jamming), independent of which device is creating the interference and whether the interference is currently present in the channel of interest. To accomplish this, the communication device may exploit knowledge of the planned use of frequencies by the communication device by exchanging the communication plan with other communication devices with which the communication device is in communication at least one predetermined time period in advance of use of the frequencies. Each predetermined time period may be about 1-10 ms, for example. FIG. 4 illustrates a communication flowchart in accordance with some embodiments. The method 400 may be performed by the communication devices described in reference to FIGS. 1-3. Other steps may be present, such as the other embodiments discussed herein, but are not shown for convenience.

At step 402 of the method, the communication device may determine future RF channel use by the communication device. The communication device may determine RF channel use over only the next predetermined time period or over multiple future predetermined time periods that include the next predetermined time period. The RF channel use determined may include one RF channel or multiple RF channels, depending on the RF channels currently active. While in some cases, the RF channel use may be dependent on, for example, a predetermined frequency hopping sequence, in other embodiments, the RF channel use may be dependent on a priori knowledge by the communication device of a change in the RF environment and the response to the change. The change may be in the future (during the next predetermined time period) and the response of the communication device or a change that started in the current predetermined time period and the response in the next predetermined time period. In some cases, the change may be intentional, such as interference (jamming) caused intentionally by other local or remote RF sources. Alternatively, the change may be unintentional, such as interference caused by activation of other devices local to the communication device. The communication device may detect the RF change in the RF environment through any of a number of techniques, among others: communication with the interferer (e.g., direct communication between the communication device and interferer or reception of a broadcast announcement by the interferer indicating future RF channel use), or detection of a particular message such as a request-to-send or clear-to-send message or particular features of a signal (such as center frequency and bandwidth), or the presence of a signal with a threshold power level (e.g., using smoothed power spectral) from the interferer in a particular RF channel.

Whether the interference is intentional or unintentional, the communication device may use a priori knowledge of the RF environment in the current predetermined time period and the response in the next predetermined time period to determine the RF channel use in the next predetermined time period. To this end, the communication device may, at step 404, determine whether self-interference is going to be caused by responding to the change in the RF environment. The self-interference may occur due to power amplification by the communication device of the response to the interference despite internal measures (e.g., noise cancellation between the transmitter and receiver chains) taken to combat self-interference. The interference may be solely based on transmissions from the communication device or may be a combination of such transmissions in addition to transmissions by devices other than the communication device (whether intended to cause interference or not).

If the communication device determines that the response will cause self-interference at step 404, the communication device may determine at step 406 one or more RF channels that will be available, i.e., free from interference caused by the communication device, during the next predetermined time period. The one or more RF channels may be referred to herein as a frequency plan that is generated by a frequency plan generator, which may be software within the processing circuitry (such as that shown in FIGS. 2 and 3) or dedicated hardware external to the processing circuitry used for generation and encoding/decoding of communications. In the latter case, for example, the dedicated hardware may include an adaptive source module, source class estimator, etc. to determine a class of the interference source, determine effectiveness of various countermeasures by calculating a detection range and potential degradation of the source from different techniques and determine the appropriate techniques to take in response to the interference.

The free RF channels may be determined by the communication device as those RF channels that are free from both external and self-interference. Alternatively, the free RF channels may be determined by the communication device as those RF channels that are free from self-interference. For example, if the interferer is a jamming signal that the communication device has just detected in the current predetermined time period or a priori knows will be transmitted in the next predetermined time period(s), the communication device may itself transmit a signal in response to the jamming signal. The a priori knowledge may arise, for example, from a determination of periodicity of the jamming signal; e.g., the jamming signal occupies one or more RF channels at intervals determined by observation of the communication device or another device that provides such information to the communication device. In other embodiments, the communication device may be able to predict the change in the RF environment by other conditions, such as if the interference stems from nearby heating/cooling units, mechanical elements or other internet of things (IoT) devices that activate under certain conditions (e.g., temperature reaches a particular threshold) that are also detectable by the communication device.

Once the free RF channels are determined at step 406, at step 408 the communication device may transmit an indication of a frequency or set of frequencies and may further contain an identifier of the communication device. The indication may be transmitted in the current predetermined time period to the other communication device affected by the self-interference. In some embodiments, the indication may be sent on the RF channel used to communicate with the other communication device. In other embodiments, the indication may be transmitted to the other communication device or broadcast on one or more control channels. Each control channel may be a specific RF channel on which only control information such as RF channel usage (rather than data) is provided. The information transmitted on the control channel may be sent via techniques used to ensure delivery of the information, independent of the RF environment. These techniques may include, for example, increased redundancy, acknowledgment, use of a different MCS, in addition to the use of a wider bandwidth or replicated transmission on multiple disparate RF channels (e.g., at band edges or in different RF bands).

The indication may include the RF channel for the other communication device to use during the next predetermined time period or next set of predetermined time periods. The indication may be provided directly as a frequency or may be encoded as a numerical indication, where the numerical indication is indicative of the RF channel—a list of numerical indications having been previous indicated by the communication device to the other communication device. Alternatively, the indication may indicate the frequency plan of all available RF channels for negotiation of which of the RF channels to use during the next predetermined time period or next set of predetermined time periods. If the frequency plan is transmitted, the communication device may send a prioritization of the RF channels in the frequency plan for the negotiation with the other communication device. The negotiation, including response from the other communication device, may occur on the RF channel on which the communication device and other communication device are communicating and over a time period before the communication device is unable to determine the signal from the other communication device. Alternatively, the negotiation may occur on the control channel. When the communication device is in communication with multiple other communication devices, the frequency plan and/or prioritization within the frequency plan for each other communication device may be independent of the frequency plan/prioritization of others of the other communication devices. In other embodiments, the communication device may deliberately adjust the frequency plan and/or prioritization for one other communication device based on the frequency plan/prioritization sent to others of the other communication devices to reduce the possibility of the other communication devices selecting the same RF channel to use in the next predetermined time period, thereby reducing the amount of negotiation for all other communication devices to be accommodated. In some embodiments, the other communication devices may negotiate amongst themselves (using a control channel) to determine the RF channel to use. In other embodiments, a master node that is separate from the communication device and other communication devices may determine the RF channel for each other communication device to use, using the control channel to transmit this information to the other communication devices.

The indication may be provided at a specific time within an predetermined time period (e.g., in the middle or at the end of the predetermined time period). The indication may be provided in each predetermined time period, independent of whether the RF channel usage is to change or may be provided only in response to a change in RF channel usage caused by the change in the RF environment. In the former case, the indication may provide a change indication that indicates whether the RF channel is to change—that is, either a value indicating that no RF channel change is to occur or the indication of the new RF channel.

In some embodiments, a request may be transmitted to the other communication device before or with the indication. The request may request that the other communication device increase transmission power on the first RF channel to the communication device to a predetermined power level. For example, the power level may be selected to provide a minimum bit error rate (BER), or maximum signal-to-interference ratio (SNR) or signal-to-interference-plus-noise ratio (SINR). In addition or instead, the request may include a change of modulation and/or coding scheme.

After transmission of the indication at step 408, the communication device and the other communication device may at step 410 continue communications using the new RF channel during the next predetermined time period. For example, the communication device may wait for an acknowledgment from the other communication device before communicating with the other communication device on the new RF channel. In some cases, the acknowledgment may be provided on the RF channel used in the current predetermined time period if before the end of the current predetermined time period (before the start of the interference) and on the new RF channel used in the next predetermined time period if after the end of the current predetermined time period. In other cases, the acknowledgment may be communicated using a control channel before or after the end of the current predetermined time period.

In some embodiments, a separate handshake may be used to continue the communications; one or more backup channels (i.e., the control channels) may be used to re-establish the connection. In some embodiments, the handshake message may be transmitted on pre-coordinated backup channels that cycle at a relatively slow rate. The backup frequencies may be known to the communication device and other communication devices and the receiver may cycle through the backup frequencies at a relatively fast rate in an attempt to receive the handshake message. Once the handshake message is received, the acknowledgment may be transmitted as above (e.g., on the current RF channel or another backup channel) and communication may be continued. Alternatively, the handshake may be used prior to the new RF channel to be used being sent.

The communications using the new RF channel may use the protocols dependent on the RF band used. For example, communication on the unlicensed band may use RTS/CTS, unlike communication on a licensed band, such as the LTE band. To transmit the data, the communication device and other communication device may, for example, encrypt the data and apply forward error correction to the encrypted data. The encrypted data may then be packetized into messages and transmitted. In some embodiments, the transmitting communication device may wait for an acknowledgement from the receiving communication device before sending the next message.

In addition to the above frequency hopping based on predicted interference, the communication device and other communication device may also communicate via frequency hopping with a fixed (or variable) hop period and packet size that rotates through the available RF channels to further reduce the effects of normal network interference. However, a portion of the total network bandwidth available to the communication device and other communication device may be dedicated to the above dynamic usage exchange. Any communications modulation such as Binary Phase Shift Keying (BPSK), Quadrature Phase Shift Keying (QPSK), Gaussian Minimum Shift Keying (GMSK), or Quadrature Amplitude Modulation (QAM) may be used, dependent, for example, on the amount of interference on the RF channel and the signal-to-noise ratio (SNR) required by that modulation to achieve the required bit error rate (BER) for the chosen forward error correction (FEC) coding. The communication may use interleaving (dispersal of bits into multiple burst sequences to change the adjacent relationship between bits) and forward error correction (FEC), among others, to enhance the tolerance to bit errors and lost packets. The communication device and other communication device may be time synchronized using synchronization signals, for example, prior to communication.

The communication device and other communication device (as well as other communication devices that are part of a collaborative network) may track the physical locations of each other, as well as other participants if in a local wireless network. The locations may be updated on time scales of seconds or minutes. Each of the communication device and other communication device may conduct a periodic scan at its location to identify interference from other sources outside of the network, e.g., a nearby television transmitter or jammer. In some cases, the locations may further be used to predict the effects of future interference. Each of the communication device and other communication device may share spectrum usage for the near future (e.g., ms to s) and may build an interference map for the near future based on this time period. In some embodiments, the communication device and other communication device may provide a list of planned transmissions, including start time, stop time, frequency, and/or radiated power. The interference map may take into account multiple types of interference, including interference from transmitters outside the cooperative network containing the communication device and other communication device, interference from transmissions (co-site interference) of the transmitting device (including harmonics, spurious emission, intermodulation products, phase noise and broadband noise), and interference from other network participants, taking into account frequencies, transmit power, and path loss. The communication device and other communication device may build a hop pattern for reception to avoid local interference and share the receiver hop pattern for scheduling of the communications.

In some embodiments, the communication device may generally be able to predict and avoid interference before the interference occurs, rather than detecting and mitigating existing interference. Using a priori knowledge of what will become congested from known sources on a predetermined time period-by-predetermined time period basis, the available frequencies (RF channels) may be calculated for each predetermine time period. The available frequencies may account for harmonics and spurs from the known sources to find best RF channels to receive communications from each other communication device. In some embodiments, the calculation may avoid a clear channel search for available RF channels by exchanging frequency plans (current and future frequency use by a communication device) between participants in a collaborative network that includes the communication device and other communication devices in communication with the communication device. The various participants in the collaborative network may send the used RF channels and perhaps participant ID and/or priority information of the data or participant. The various participants may determine free frequencies based on the individual determinations and/or may send available frequencies over a pre-coordinated RF channel, which may be fixed or may vary over time. The transmission may be acknowledged by the participants and, after determination of a new RF channel to use, thereafter the participants may move to the new RF channel, transmit and wait for acknowledgement of the transmission before sending another transmission. In addition, a list of backup channels may be generated and exchanged prior to exchange of the frequency plans to re-establish the connection via a handshake if the communication fails. In this manner, communication may continue regardless of whether the interference is intentional or unintentional and responses to the interference (e.g., jamming countermeasures) may continue while communications are in progress. Control channels used to establish an initial connection may be pre-coordinated and used throughout a particular time period.

Thus, if a system of wireless communications devices has knowledge of when in the future and at what frequencies interference is going to occur, then the system can use that information to plan out future frequencies and times to communicate and avoid the interference. For complex interference environments, given sufficient a priori knowledge, the technique could include planning a hop pattern of when to change frequencies and which frequencies to tune to before the interference occurs. This foreknowledge may include both specific frequencies and times of interference, and may not be limited to a purely statistical prediction based on data from sensing the environment in the past. For example, a priori knowledge may exist of a specific piece of user equipment queries for new messages every 10 seconds, of the hop pattern of a frequency hopping radio, the PRI and scan pattern of a radar, or a timetable when a wireless sensor will report its most recent measurement to a server. This advanced knowledge of spectrum usage can be acquired in many ways, including any combination of being pre-programmed into the system, or shared cooperatively real-time within the system, or learned using methods like artificial intelligence, e.g., machine learning. In some embodiments, every device using a set of channels may share in advance how the device intends to use a specific frequency spectrum, even if only a few milliseconds in advance, which may allow devices to avoid each other's interference. For example, if an IOT sensor broadcasts every few seconds, the transmission schedule for what channel the IOT sensor will use and when the IOT sensor will be sending out sensor updates, may allow other devices to freely share the same channel, knowing when to pause (or move to a different channel) because the other devices may know when the interference will occur before it occurs thanks to dynamic usage exchange.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The invention claimed is:

1. A communication device comprising:
transmit circuitry configured to wirelessly communicate with another communication device on a first radio frequency (RF) channel; and
a hardware processor coupled to the transmit circuitry, the hardware processor configured to:
use a priori knowledge of a future change in an RF environment to determine to transmit interfering signals on a second RF channel in response to the future change, the a priori knowledge comprising a determination by the processor of a malicious signal to be transmitted by an interfering device intending to interfere with communications of the communication device, determination of the malicious signal based on a center frequency and bandwidth of the malicious signal;
determine that transmission of the interfering signals will cause self-interference in reception of signals from the other communication device on the first RF channel;
configure the transmit circuitry to transmit an indication to the other communication device to indicate a third RF channel for communication with the communication device based on a determination that transmission of the interfering signals on the second RF channel would interfere with reception of signals from the other communication device on the first RF channel, the indication transmitted on a dedicated RF control channel that is different from frequencies of the first RF channel, the second RF channel and the third RF channel, for multiple indications: each indication periodically transmitted to cover a predetermined time period between transmissions and transmitted at a specific time within each predetermined time period; and
after transmission of the indication, configure the transmit circuitry to:
transmit the interfering signals on the second RF channel responsive to the change in the RF environment, and
communicate with the other communication device, during the transmission of the interfering signals, via the third RF channel instead of the first RF channel.

2. The device of claim 1, wherein the hardware processor is further configured to:
configure the transmit circuitry to transmit the indication on the first RF channel.

3. The device of claim 1, wherein:
the hardware processor is further configured to negotiate, in response to the transmission of the indication and prior to the transmission on third RF channel, transmission on the third RF channel with the other communication device, the indication comprises a plurality of RF channels for communication with the communication device, and the plurality of RF channels comprises the third RF channel.

4. The device of claim 3, wherein:

the indication comprises a priority for communication with the communication device for each RF channel in the plurality of RF channels.

5. The device of claim 1, wherein the hardware processor is further configured to:

select the third RF channel as an RF channel unaffected by interference caused by the transmission of the interfering signals in the RF second channel.

6. The device of claim 1, wherein the hardware processor is further configured to:

after the determination that the transmission on the second RF channel interferes with the reception of communications from the other communication device on the first RF channel and prior to the transmission of the indication, configure the transmit circuitry to transmit a request to the other communication device, the request requesting that the other communication device increase transmission power on the first RF channel to the communication device to a predetermined power level, determine, from feedback provided by the other communication device in response to the request, whether the other communication device is to transmit to the communication device at the predetermined power level, and transmit the indication in response to the feedback indicating that the other communication device is not to transmit to the communication device at the predetermined power level.

7. The device of claim 1, wherein the hardware processor is further configured to:

predict transmission of a new signal in the RF environment from an interfering source as the future change in the RF environment, and respond to the new signal by configuring the transmit circuitry to transmit on the second RF channel.

8. The device of claim 1, wherein the hardware processor is further configured to:

determine whether an acknowledgment has been received from the other communication device in response to the indication, if the acknowledgment has been received, determine, from the acknowledgment whether the other communication device is to transmit on the third RF channel, and in response to a determination that the other communication device is to transmit on the third RF channel, communicate on the third RF channel.

9. The device of claim 1, wherein the hardware processor is further configured to:

determine whether an acknowledgment has been received from the other communication device in response to the indication, in response to a determination that the acknowledgment has not been received, repeat transmission of the indication until an earlier of the acknowledgment has been received or a predetermined number of transmissions of the indication has occurred, if the acknowledgment has been received, determine, from the acknowledgment, on which RF channel of a plurality of available RF channels the other communication device is to transmit, select the third RF channel in response to a determination that the other communication device is unable to transmit on at least one of the available RF channels, and transmit to the other communication device an indication of the third RF channel to which the other communication device to switch for communication with the communication device.

10. The device of claim 1, wherein the hardware processor is further configured to determine whether to use the third RF channel based on a determination of non-communication-based interference stemming from thermal systems or mechanical elements that activate under predetermined thermal conditions.

11. The device of claim 1, wherein the hardware processor is further configured to periodically provide to the other communication device a change indication that indicates whether the RF channel is to change, the change indication provided independent of whether the RF channel usage is to change.

12. The device of claim 1, wherein the hardware processor is further configured to determine the third RF channel based on feedback from the other communication device in response to transmission to the other communication device to switch to a different RF channel, the third RF channel negotiated among the other communication device and additional communication devices in communication with the communication device.

13. The device of claim 1, wherein:

the hardware processor is further configured to encode, for transmission to the other communication device prior to determination to transmit the interfering signals, a list of numerical indications and associated frequency for each numerical indication, and the indication is encoded as one of the numerical indications that is associated with the third RF channel.

14. The device of claim 1, wherein:

the a priori knowledge further includes a location of the communication device and the other communication device, and the hardware processor is further configured to conduct a periodic scan to determine the location of the communication device and decode, from the other communication device, the location of the other communication device to use for the a priori knowledge.

15. A method of a communication device communicating with another communication device, the method comprising:

exchanging a handshake with the other communication device on a control channel;

after exchanging the handshakes, communicating with the other communication device on a radio frequency (RF) channel in a current predetermined time period;

during the current predetermined time period, using a priori knowledge of an RF environment to determine a change in the RF environment in a next predetermined time period, the a priori knowledge comprising determining a malicious signal is to be transmitted in the next predetermined time period by an interfering device intending to interfere with communications of the communication device, determining of the malicious signal based on a center frequency and bandwidth of the malicious signal;

determining:

countermeasures to take in response to the change in the RF environment based on a class of the interfering device, effectiveness of different countermeasures by calculation of a detection range, and potential degradation of the interfering device, the countermeasures comprising transmitting on a countermeasure RF channel, and transmission on the countermeasure RF channel interferes with the reception of communications from the other communication device on the RF channel;

during the current predetermined time period, transmitting, in response to determining interference by transmission on the countermeasure RF channel, an indication to the other communication device that communication during the next predetermined time period is to change from the RF channel to a different RF channel; and during the next predetermined time period:
transmitting on the countermeasure RF channel, and
communicating with the other communication device on an available RF channel on which communications from other communication device are detectable despite transmitting on the countermeasure RF channel, the indication transmitted on a dedicated RF control channel that is different from frequencies of the RF channel and the available RF channel.

16. The method of claim 15, wherein:
the indication is transmitted on the RF channel.

17. The method of claim 15, wherein:
the dedicated control channel is the control channel used to exchange the handshake.

18. The method of claim 15, wherein:
the method further comprises negotiating with the other communication device to transmit on the available RF channel,
the indication comprises a plurality of RF channels for communication with the communication device, and
the plurality of RF channels comprises the different RF channel and the available RF channel.

19. The method of claim 15, wherein:
the method further comprises negotiating with the other communication device to transmit on the available RF channel, and the negotiation comprises:
determining whether an acknowledgment has been received from the other communication device in response to the indication,
if the acknowledgment has been received, determining, from the acknowledgment, whether communications from the other communication device will be received on the different RF channel in the next predetermined time period, and
selecting the available RF channel after determining from the acknowledgment that communications from the other communication device will not be received on the different RF channel in the next predetermined time period, the available RF channel indicated by the other communication device.

20. A non-transitory machine-readable storage device including instructions stored thereon that, when executed by a machine, configure the machine to perform operations comprising:
communicating with another communication device on a radio frequency (RF) channel in a current predetermined time period;
during the current predetermined time period, using a priori knowledge of an RF environment to determine a change in the RF environment in a next predetermined time period, the a priori knowledge comprising determining a malicious signal is to be transmitted in the next predetermined time period by an interfering device intending to interfere with communications of the communication device, determining of the malicious signal based on a center frequency and bandwidth of the malicious signal;
determining:
countermeasures to take in response to the change in the RF environment based on a class of the interfering device, effectiveness of different countermeasures by calculation of a detection range, and potential degradation of the interfering device, the countermeasures comprising transmitting on a countermeasure RF channel, and
transmission on the countermeasure RF channel interferes with the reception of communications from the other communication device on the RF channel;
during the current predetermined time period, transmitting, in response to determining interference by transmission on the countermeasure RF channel, an indication to the other communication device that communication during the next predetermined time period is to change from the RF channel; and
during the next predetermined time period:
transmitting on the countermeasure RF channel; and
communicating with the other communication device on an available RF channel on which communications from other communication device are detectable despite transmitting on the countermeasure RF channel, the indication transmitted on a dedicated RF control channel that is different from frequencies of the RF channel and the countermeasure RF channel.

21. The non-transitory machine-readable storage device of claim 20, wherein the operations further include negotiating with the other communication device to transmit on the available RF channel by:
sending one or more RF channels in the indication, the one or more channels comprising the available RF channel, and
receiving a response from the other communication device that indicates the available RF channel to be used by the other communication device in the next predetermined time period.

* * * * *